Figure 1:
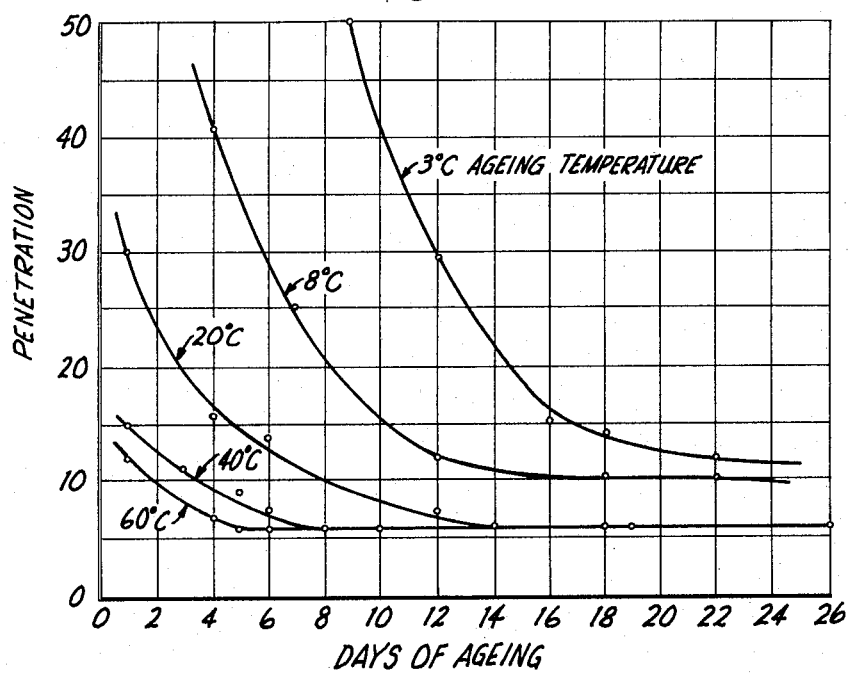

United States Patent [19]
Doi

[11] 3,811,911
[45] May 21, 1974

[54] FLEXIBLE PAVEMENT COATING METHOD
[75] Inventor: Tadashi Doi, Wakayama, Japan
[73] Assignee: Kao Soap Co., Ltd., Tokyo, Japan
[22] Filed: Mar. 20, 1972
[21] Appl. No.: 236,218

Related U.S. Application Data
[63] Continuation-in-part of Ser. No. 28,909, April 15, 1970, abandoned.

[30] Foreign Application Priority Data
Apr. 22, 1969 Japan.............................. 44-31176

[52] U.S. Cl.......... 117/33, 117/161 ZB, 260/18 EP, 260/47 EP, 260/47 EN
[51] Int. Cl.............................................. B44d 1/00
[58] Field of Search........ 260/18 EP, 47 EP, 47 EN; 404/20, 19; 117/161 ZB, 33, 30

[56] References Cited
UNITED STATES PATENTS
3,161,114   12/1964   Wittenwyler.......................... 404/19
2,915,485   12/1959   Shokal ............................ 260/18 EP
2,089,569    8/1937   Orthner........................... 260/486 R
3,038,393    6/1962   Nagen et al........................... 117/30
3,334,555    8/1967   Nagen et al................... 117/161 ZB
3,547,881   12/1970   Muller et al. ................... 260/47 EP
3,635,845    1/1972   Porret et al................... 117/161 ZB FOREIGN PATENTS OR APPLICATIONS
229,422   7/1960   Australia............................. 260/47

Primary Examiner—William D. Martin
Assistant Examiner—Dennis C. Konopacki
Attorney, Agent, or Firm—Woodhams, Blanchard and Flynn

[57]   ABSTRACT

A process for applying to the surface of a flexible pavement material a protective and anti-skid coating of a polyepoxide composition, which can contain pigments and aggregates, comprising an epoxy resin, oleylamine and the pigments and aggregate particles. The coating increases surprisingly the durability of said flexible pavement material.

8 Claims, 2 Drawing Figures

FLEXIBLE PAVEMENT COATING METHOD

CROSS-REFERENCE TO RELATED APPLICATION

This application is a continuation-in-part of application Ser. No. 28,909, filed Apr. 15, 1970, now abandoned.

BACKGROUND OF THE INVENTION

1. Field of the Invention

This invention relates to a method of improving the properties of pavements by coating thereon a polyepoxide composition.

2. Description of the Prior Art

Coatings of a variety of kinds have been applied to pavement material in order to impart to said material various properties such as non-skid properties, and resistance to abrasion, oil, chemicals and variation in color.

Heretofore a thin layer anti-skid coating has been proposed using as a binder material polyepoxide composition having as curing agent incorporated therein a polyamine such as ethylenediamine, diethylenetriamine and polyamideamine. Such a coating, using the aforesaid cured polyepoxide binder, has not proven satisfactory for an important kind of paving material, namely those which have as a main binder for aggregate, asphalt or other bituminous or like material. These pavement materials are characterized in that they are flexible, and exhibit flexure under normal usage. The prior coating material has not proven satisfactory for this kind of pavement material because of the rigidity of the cured coating. It will not deform or flex as the pavement material deforms and flexes in use as by the passage of traffic over it. Consequently, these prior coatings tend to crack and to separate from the pavement material. This is aggravated by differences in thermal expansion coefficients which will cause separation of the inflexible coating from the pavement material, which will then crack under the stress of traffic.

SUMMARY OF THE INVENTION

The present invention provides a method for coating flexible pavement material which comprises applying a composition comprising a polyepoxide binder having oleylamine as curing agent, and is based in part on the discovery that when such polyepoxide composition is allowed to cure, there occurs a linear polymerization reaction to produce a flexible and thermoplastic cured material, which is surprisingly suitable as a coating for flexible pavement material, displaying properties of durability, resistance to oil and chemicals and resistance to cracking and separation from the pavement material.

The polyepoxide reaction with oleylamine should be carried out so as to favor the formation of linear polymers:

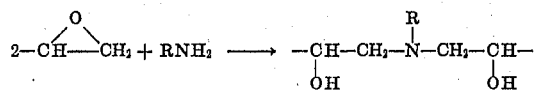

in which R is the oleyl radical.

For this purpose, it is sufficient to use oleylamine in an amount equal to or larger than the amount of oleylamine that is theoretically required to advance the polymerization reaction to the maximum extent, and in which the weight ratio of oleylamine to epoxy compound is substantially equal to the ratio of (1) the molecular weight of oleylamine divided by the number of hydrogen atoms contained in the amino group to (2) the epoxy equivalent of the epoxy compound. Usually, 50 to 150 parts by weight of oleylamine can be used per 100 parts by weight of the polyepoxide compound. If oleylamine is used in an amount less than the above range, the reaction will tend to produce a crosslinked, more rigid polymer.

The polyepoxide binder produced as above is compatible with bituminous materials and petroleum resins and can be successfully used in mixtures with a bituminous material, such as asphalt, or petroleum resin.

The polyepoxide can be mixed with aggregate or the aggregate can be applied separately, before or after the polyepoxide composition. The aggregate material can be any of the conventional mineral aggregates such as pulverized ceramic material, pulverized serpentine or limestone, sand, glass beads, pulverized mixed stone, alumina, iron furnace slag; and the particle size can range from about 0.5 to 25 mm., depending on the particular application. The weight ratio of polyepoxide binder to aggregate can be in the range of from two to 100 parts by weight of polyepoxide binder to 100 parts of aggregate.

The polyepoxide compounds to be used in the present invention include diglycidyl ethers of bisphenol A, dicyclopentadiene dioxide, diglycidyl ethers of dimer alcohols and the like. Among such polyepoxides, the most preferred are diglycidyl ethers of bisphenol A obtained by reacting 2,2-bis(4-hydroxyphenyl)-propane with epichlorohydrin in an alkaline medium, which have already been placed on the market as a typical polyepoxide.

The polyepoxide composition of the present invention can cure satisfactorily without heating to form a cured product having an excellent flexibility and oil and chemical resistance sufficient for the object of the present invention.

As described above, the polyepoxide composition of the present invention is suitable for use as a binder for the surface treatment of flexible pavements. As the flexible pavement, there can be used conventional flexible pavement materials such as straight asphalt, blown asphalt, an asphalt modified with a high molecular compound, tar, polyethylene, polyvinyl chloride, polyvinyl acetate and rubbers, and the composition of the present invention can be conveniently applied to any surface paved with such a flexible material. The treatment of the surfaces of flexible pavements can be performed by directly applying the composition of the present invention to the surface of the pavement and hot rolling the coating to compact it prior to the curing of the composition. The coating is usually provided in a thickness of 1 to 50 mm.

The polyepoxide composition of the present invention can be applied to the surface of a pavement either alone or in mixture with up to 75 percent by weight of asphalt or petroleum resin, based on the total weight of the composition. In the latter case, there can be used various solvents in a small amount so as to facilitate the mixing thereof. The solvents which can be suitably used are xylene, benzene, toluene and other aromatic hydrocarbons, though other solvents can also be used.

Although the amount of the curing agent to be used in the polyepoxide composition of the present invention can vary to some extent, the optimum amount of curing agent is the amount of the curing agent when the weight ratio of the curing agent to the polyepoxide used is substantially equal to the ratio of the molecular weight of the curing agent compound (267.5) divided by the number of the active hydrogen atoms (2) contained in the amino groups of the curing agent compound to the epoxy equivalent to the polyepoxide. As described above, when a curing agent is used in this optimum amount, the polymerization reaction will advance to the greatest possible extent to yield a cured product having the highest quality in such properties as oil resistance and brittleness temperature.

As described above, the polyepoxide composition of this invention can be used not only in the surface treatment of a flexible pavement but also in other various pavement uses. Some examples of such applications will be described below.

1. Operation by spraying

A. Floor surface for heavy wheel or foot traffic required to have nonslipping or oil and chemical resistant properties 70 parts by weight of oleylamine are mixed with 100 parts by weight of diglycidyl ether of bisphenol A (trade mark: Epicoat 828). About 0.6 to 1.5 kg./m.$^2$ of the mixture are sprayed on the surface of the above mentioned asphalt type floor within a suitable time (e.g., 40 minutes at 35°C. with 10 liters). About 3 to 5 kg./m.$^2$ of a mineral aggregate of about 1.0 mm. to 2.5 mm. in particle size is sprinkled thereon before the resin hardens. Suitable aggregates are pulverized ceramic, serpentine, limestone or river sand. One day later, when another layer of the same mixture is placed on it, any unevenness of the sprinkling can be eliminated.

B. Colored road pavement for wheel traffic 70 parts by weight of oleylamine are mixed with 100 parts by weight of diglycidyl ether of bisphenol A (Epicoat 828) and about 0.5 to two parts by weight of a pigment of a predetermined color (such as iron oxide or lead molybdate of red, chromium oxide of green, lead chromate of yellow, ferric ferrocyamide of blue or titanium oxide of white or an appropriate mixture thereof) are added into the mixture. About 0.6 to 1.5 kg./m.$^2$ of the mixture are sprayed on the above mentioned type of road surface within a suitable time. About 3 to 5 kg./m.$^2$ of a colored aggregate (such as, for example, a ceramic powder, serpentine or limestone) of about 1.0 to 2.5 mm. in particle size are sprinkled thereon before the resin hardens. Another layer of the same mixture is placed on it to eliminate the unevenness of the sprinkling.

2. Neat type method

C. Floor for foot traffic required to have nonslipping or oil and chemical resistant properties 70 parts by weight of oleylamine are mixed with 100 parts by weight of diglycidyl ether of bisphenol A. (Epicoat 828). About 30 to 70 percent by weight, based on the weight of the aggregate, of this mixture is added to and mixed with a mineral aggregate as before described of an appropriate granularity of about 1.0 to 5 mm. in particle size to make a composite material. This composite material has a self-flattening property and therefore can be laid and spread with a rubber rake so as to be 1 to 5 mm. thick. An additional aggregate of about 1.0 to 2.5 mm. in particle size is sprinkled or blown on it.

D. Colored pavement 70 parts by weight of oleylamine are mixed with 100 parts by weight of diglycidyl ether of bisphenol A (Epicoat 828). About 0.5 to 2 percent of the pigment mentioned in the above paragraph B is added to this mixture. About 30 to 70 percent by weight, based on the weight of the aggregate, of this colored mixture is added to a colored aggregate, e.g., silica sand or river sand of a proper granularity of about 1 to 5 mm. in particle size. This colored composite material has a self-flattening property and therefore can be laid on an asphalt type road surface and spread with a rubber rake so as to be about 1 to 5 mm. thick. A colored aggregate of less than 2 mm. is sprinkled thereon.

E. Road line 70 parts by weight of oleylamine are mixed with 100 parts by weight of diglycidyl ether of bisphenol A (Epicoat 828). About 20 to 60 percent by weight, based on the weight of the aggregate, of the mixture is added to an aggregate of a composition of 20 parts by weight of a silica sand (of less than 0.07 mm.), 25 parts by weight of alumina, five parts by weight of titanium white and 5 parts by weight of glass beads. The mixture is heated to about 200° to 250°C. for application. The mixture is poured into a frame of a predetermined width and, while it is being spread with a thickness adjusting plate, a line is drawn on an asphalt type road. When the line reaches room temperature, the road can be opened to traffic. When the rapid opening of the road to traffic is not required, the application can be carried out at atmospheric temperature.

3. Method with a composite material required to be compacted

F. Floor pavement for heavy wheel or foot traffic required to have nonslipping or oil and chemical resistant properties 70 parts by weight of oleylamine are mixed with 100 parts by weight of diglycidyl ether of bisphenol A (Epicoat 828). About 2 to 30 percent by weight of this mixture is added to a mineral aggregate of the types previously mentioned of a granularity in an appropriate range of about 5 to 20 mm. to prepare a composite material. It is laid on an asphalt type road surface and spread and is compacted by an appropriate compaction means such as, for example, an iron wheel roller or trowel.

G. Colored pavement 70 parts by weight of oleylamine are mixed with 100 parts by weight of diglycidyl ether of bisphenol A (Epicoat 828). About 0.2 to 2 percent of the pigment mentioned in the above paragraph (3) is added to this mixture. About 2 to 30 percent by weight of this colored mixture is added to an aggregate or colored aggregate of the types previously mentioned of an appropriate granularity of 5 to 20 mm. to prepare a composite material. It is laid on an asphalt type road surface and spread and is compacted by an appropriate compaction means such as, for example, an iron wheel roller or trowel. If required, the surface can be ground out to make a fine mosaic surface.

The present invention will now be illustrated by the following specific examples which are given by way of illustration only, and the present invention is not limited to the use of the particular compounds and conditions as disclosed in the examples. In the examples, all parts are by weight.

Figure 2:
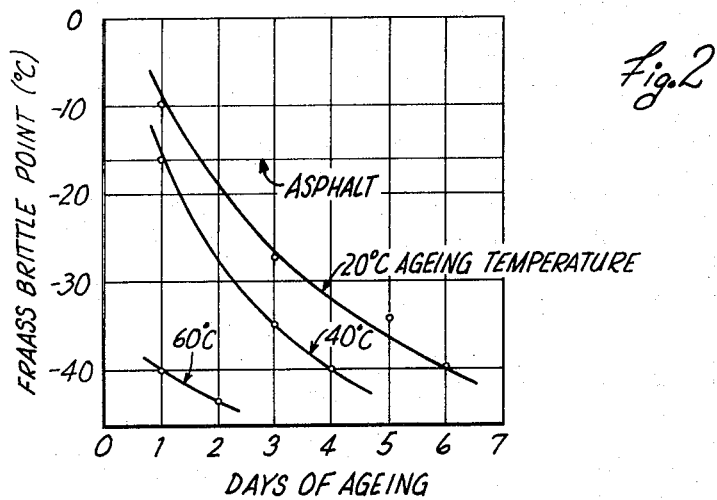

In the Drawings:

FIGS. 1 and 2 are graphs showing the test results on the samples of the polyepoxide composition according to the present invention.

The polyepoxide used in the examples was a diglycidyl ether of bisphenol A (trade name: Epikote 828, epoxy equivalent: 190, average molecular weight: 380). An asphalt of a penetration of 91, obtained by the vacuum distillation of a Kuwait crude petroleum oil, was used as the asphalt, a petroleum resin of a softening point of 62°C., obtained by the polymerization of a cracking byproduct oil from a petroleum (manufactured by Toho Petroleum Resin Co., Ltd., Japan) was used as the petroleum resin, and xylene was used as the solvent.

The viscosity was measured at 25°C. by means of a B-type rotary viscosimeter. The penetration was determined in accordance with JIS (Japanese Industrial Standard) K 2530-1960. The brittle point was determined in accordance with Fraas breaking point test method as described in the Japanese magazine "Dohro (Road)," Vol. 3, No. 3, pp. 26 (1968). The stripping test was performed in accordance with a stripping test method for asphalt film as described in "Asphalt Hoso Yoko (Outlines of Asphalt Pavement)," pp. 147 (1967) using quartz-porphyry as the aggregate. The flexibility was determined by forming a 2 mm. thick film and bending the film at 20°C., films which were not cracked on bending having been evaluated as "good."

EXAMPLE 1

Compositions comprising a polyepoxide as mentioned above (epoxy equivalent: 190) and oleylamine (molecular weight: 267, the number of active hydrogen atoms: two were subjected to various tests. These compositions are suitable for use in the above pavement applications. The results were as shown in the Table 1.

A polyepoxide composition consisting of 120 parts by weight of the polyepoxide as mentioned above and 82 parts by weight of oleylamine was aged at various temperatures and the relationship between the aging period and the penetration and between the aging period and the Fraass brittle point were determined. The results obtained were plotted on the graphs shown in FIGS. 1 and 2.

EXAMPLE 2

A Marshal stability test as described in "Asphalt Hoso Yoko (Outlines of Asphalt Pavement)," pp. 152 (1968) was made on two anti-slipping pavements. In one pavement there was used a binder consisting of 190 parts of a polyepoxide (epoxy equivalent: 190) as mentioned above and 134 parts of oleylamine in accordance with the present invention. In the other pavement there was used an asphalt (penetration: 91) as the binder for comparison. The details of the materials and formulations used were as shown in the Table 2.

The tests were made in accordance with the Marshal stability test method except the conditions as listed in the Table 3.

Table 1

| Composition | | | | | Viscosity (poises) just after mixing | 1 day | Penetration after aging (Temperature of the aging: 20°C.) for | | | | | Elongation (%) after aging for | | Brittle point (°C.) after 12 days | Stripping test after 3 days | Flexibility after 12 days |
|---|---|---|---|---|---|---|---|---|---|---|---|---|---|---|---|---|
| Asphalt | Petroleum resin | Oleylamine | Polyepoxide | Xylene | | | 3 days | 4 days | 7 days | 10 days | 12 days | 1 day | 3 days | | | |
| — | — | 82 | 120 | — | 1.6 | 30 | 20 | 17 | 12 | 9 | 7 | >150 | — | −40 | <5% | Good |
| 50 | — | 62 | 90 | 8 | 5.2 | 206 | 57 | 53 | 44 | 38 | 36 | — | — | −24 | Do. | Good |
| 100 | — | 41 | 60 | 15 | 14.8 | — | 184 | 133 | 101 | 83 | 76 | — | 80 | −34 | Do. | Good |
| — | 100 | 41 | 60 | 15 | 16.0 | — | 151 | 116 | 91 | 74 | 60 | — | — | −30 | Do. | Good |
| 200 | — | — | — | — | 3×10⁶ | 91 | — | — | — | — | — | >150 | — | −13 | >5% | Good |

Table 2

| | Macadam | Sand | Silica sand | | | Filler | Composition of this invention | Asphalt |
|---|---|---|---|---|---|---|---|---|
| Particle size (mm) | 5–2.5 | 2.5–1.2 | 1.2–0.6 | 0.6–0.3 | 0.3–0.15 | less than 0.074 | — | — |
| Specific gravity (Surface dry) | 2.67 | 2.63 | 2.58 | 2.72 | 2.65 | 2.68 | 1.03 | 1.015 |
| Proportion (%) | 11.5 | 18.4 | 18.4 | 16.1 | 11.5 | 8.7 | 8.0 | 8.0 |

Table 3

| Kinds of Binder | Temperature of aggregate | Temperature of binder | Mixing temperature | Tightening number (times) | Aging period (days) | Aging temperature | Tester |
|---|---|---|---|---|---|---|---|
| Composition of the present invention | Room temperature | Room temperature | 50 on each temperature | As shown in side | As shown in Table 4 | Oil hydraulic Table 4 | compression testor (Compression rate: 1 cm./min.) |
| Asphalt | 160°C. | 140°C. | 155°C. | Each side 50 | 1 | Room temperature | Marshal's testor |

The test results were as shown in the Tables 4 and 5.

Table 4

| Kinds of Binder | Aging temperature (°C.) | Aging period (days) | Temperature of soaking water (°C.) | Stability (kg.) | Flow value (1/100 cm) |
|---|---|---|---|---|---|
| Composition of the present invention | 8 | 17 | 8 | 19,600 | 25 |
| | 20 | 14 | 20 | 20,500 | 49 |
| | 30 | 18 | 30 | 20,600 | 30 |
| | 60 | 3 | 40 | 7,500 | 74 |
| | 60 | 3 | 50 | 6,240 | 69 |
| | 60 | 3 | 60 | 4,700 | 72 |
| | 60 | 3 | 80 | 3,300 | 95 |
| Asphalt | Room temperature | 1 | 8 | 4,400 | 29 |
| | | | 30 | 1,779 | 30 |
| | | | 40 | 944 | 34 |
| | | | 50 | 545 | 32 |
| | | | 60 | 330 | 24 |
| | | | 80 | 132 | 22 |

Table 5

| Kinds of Binder | Theoretical density | Actual density | Volume of binder (%) | Porosity (%) | Intersticiality of aggregate (%) | Saturation degree (%) |
|---|---|---|---|---|---|---|
| Composition of this invention | 2.350 | 2.188 | 17.00 | 6.88 | 23.88 | 71.22 |
| Asphalt | 2.354 | 2.210 | 17.47 | 6.12 | 23.66 | 74.07 |

Note: All values are averages of the values on the specimens as listed in the Table 4.

As evident from the results as disclosed in the above tables, the composition of the present invention exhibits the flow value (a measure of flexibility) comparable with that of the asphalt.

The embodiments of the invention in which an exclusive property or privilege is claimed are defined as follows:

1. The method of increasing the durability of flexible asphalt pavement material which comprises applying to the surface of said pavement material a coating comprising a binder of 100 parts by weight of an epoxy resin and 50 to 150 parts by weight of oleylamine, and allowing said coating to cure.

2. The method of claim 1 wherein the flexible pavement material is asphalt.

3. The method of claim 1 in which the coating also contains aggregate and the weight ratio of binder to aggregate particles is in the range of from two to 100 parts by weight of binder per 100 parts of aggregate particles.

4. The method of claim 1 in which the coating material also contains pigment material.

5. The method of claim 1 in which about 70 parts by weight of oleylamine are mixed with about 100 parts by weight of diglycidyl ether of bisphenol A and the mixture applied as a coating, and in which aggregate is added prior to curing of the applied coating.

6. The method of claim 1 in which about 70 parts by weight of oleylamine are mixed with about 100 parts of diglycidyl ether of bisphenol A and about 0.5 to two parts by weight of pigment material and the mixture applied as a coating, and in which aggregate material is added prior to curing of the applied coating.

7. The method of claim 1 in which about 70 parts by weight of oleylamine are mixed with about 100 parts by weight of diglycidyl ether of bisphenol A, and about 30 to 70 percent by weight of said mixture is added to mineral aggregate of 0.5 to 25 mm. size, and the composition is applied to said pavement material.

8. The method of claim 1 in which about 70 parts by weight of oleylamine is mixed with about 100 parts by weight of diglycidyl ether of bisphenol A and 0.5 to 2 percent by weight of pigment is added to form a colored mixture, and about 30 to 70 percent by weight of said colored mixture is mixed with mineral aggregate.

* * * * *